United States Patent
Caorle (10) Patent No.: US 6,813,979 B2
(45) Date of Patent: Nov. 9, 2004

(54) DEVICE FOR TURNING OF BRAKE DISKS OR THE LIKE INCLUDING AN AUTOMATIC RUNOUT COMPENSATION UNIT

(75) Inventor: Alberto Caorle, Marano Vicentino (IT)

(73) Assignee: Onstruzioni Meccaniche Caorle S.p.A., Vicenza (IT)

( * ) Notice: Subject to any disclaimer, the term of this patent is extended or adjusted under 35 U.S.C. 154(b) by 151 days.

(21) Appl. No.: 10/223,541

(22) Filed: Aug. 19, 2002

(65) Prior Publication Data

US 2003/0000352 A1 Jan. 2, 2003

Related U.S. Application Data

(63) Continuation-in-part of application No. 09/612,856, filed on Jul. 10, 2000, now abandoned.

(51) Int. Cl.[7] .............................. B23B 5/04; B23B 5/00
(52) U.S. Cl. ........................................... 82/112; 82/903
(58) Field of Search .......................... 82/112, 150, 151, 82/903; 33/609, 610; 73/461, 462

(56) References Cited

U.S. PATENT DOCUMENTS 5,345,672 A * 9/1994 Ball et al. ..................... 29/715
5,485,678 A * 1/1996 Wagg et al. ................... 33/610
6,101,911 A * 8/2000 Newell et al. ................. 82/112
6,227,085 B1 * 5/2001 Vasquez, Jr. .................. 82/163

* cited by examiner

Primary Examiner—A. L. Wellington
Assistant Examiner—Brian D. Walsh
(74) Attorney, Agent, or Firm—Notaro & Michalos PC (57) ABSTRACT

A brake disk turning device accommodates runout using a front flange coupled to an adapter connected to the brake hub, and a rear flange fixed to a chuck of a lathe for turning the disk. Spacing adjusters are at equal intervals around the flanges for individually adjusting a spacing between the flanges at each interval to tilt the front flange with respect to the rear flange to accommodate the runout. Each adjuster has a toothed wheel and a retractable pin movable by an actuator to intercept the wheel to incrementally rotate the wheel during rotation of the flanges. A pinion connected to the wheel is meshed with a gear. Annular grooves with varying depth are provided between the gear and the front flange with balls therein for adjusting the spacing between the gear and front flange (9) depending on their rotation position.

8 Claims, 7 Drawing Sheets

DEVICE FOR TURNING OF BRAKE DISKS OR THE LIKE INCLUDING AN AUTOMATIC RUNOUT COMPENSATION UNIT

CROSS-REFERENCE TO RELATED APPLICATION

The present application is a continuation-in-part of U.S. application Ser. No. 09/612,856 filed on Jul. 10, 2000 now abandoned, from which priority is claimed.

FIELD AND BACKGROUND OF THE INVENTION

This patent proposes a device for turning brake disks that includes an automatic compensation unit that functions to automatically compensate for runout between a lathe applied directly to the vehicle, and the brake disk to be turned.

The device according to this innovation has the advantage of being able to use an automatic alignment tool so that the job of turning the brake disks can even be entrusted to personnel without specific preparation or expertise. It also saves time compared to traditional manual systems.

It consists, in other words, of a device that allows totally automatic detecting of runout of the brake disk to be turned and consequently, using a suitable calculator, transforms signals coming from the detector into controls for an electromagnetic actuator that acts on a triad of rotating adjustment devices controlling the distance between the two faces of the alignment device.

As is known, disk brakes used on motor vehicles are subject to substantial frictional forces from brake caliper shoes, and undergo wear with the passage of time and periodically require replacement of the shoes and, if necessary, turning of the surface of the disk when the surface is found to be grooved by the shoes beyond admissible maximum values.

It is also known that the surface of the disk, in addition to the formation of grooves caused by shoe friction, is also subject to other forces that cause lateral warping of the disk. These abnormalities must also be detected and corrected during turning procedures since they could jeopardize the safety of the vehicle by generating dangerous vibrations during braking.

One of the main components of a vehicle wheel braking system employing disk brakes are the brake disks or brake rotors which provide a solid rotating surface against which the stationary brake friction pads are clamped or compressed to generate a frictional force, slowing the rotational movement of the brake disks or brake rotors and the associated vehicle wheels. These brake disks or brake rotors are subjected to repeated and substantial frictional forces by the brake friction pads, and over time, become worn. Uneven application of braking force, debris, or uneven frictional surfaces on the brake friction pads can result in the formation of grooves, channels, or scratches in the surfaces of the brake disks or brake rotors. Repeated heating and cooling of the brake disk or brake rotor resulting in extreme temperature variations can additionally result in the lateral warping of the brake disk or brake rotor.

A worn or warped brake disk or brake rotor may be resurfaced by cutting or grinding to provide a uniform smooth brake friction pad contact surface if sufficient brake disk or brake rotor material remains to provide an adequate braking surface without compromising the structural integrity of the vehicle braking system. However, once a brake disk or brake rotor has been worn below a minimum safe thickness, it is unable to safely dissipate the heat generated by a brake application, and must be replaced.

To provide for a uniform surface, any abnormalities in the brake disk or brake rotor, such as a lateral warping must be detected and compensated for during the resurfacing procedures. An additional source of lateral warping defects in a brake rotor or brake disk is often over tightened attachment bolts or an uneven mounting surface onto which the brake disk or brake rotor is secured in the vehicle wheel assembly. If the brake disk or brake rotor is removed from the vehicle wheel assembly for a resurfacing operation, any abnormalities or defects resulting from the mounting of the brake disk or brake rotor to the vehicle wheel assembly may not be accurately identified or corrected during the resurfacing procedure. Accordingly, a variety of brake resurfacing machines or brake lathes have been developed to resurface brake disks and brake rotors while they remain mounted to the vehicle wheel assembly.

At the present time, to detect and correct warping of the disk surface, monitoring devices are used to determine disk runout and to correct disk deformations.

These devices are of various types although recently the sector has seen increasingly widespread use of lathes applied directly to the hub of the vehicle. These avoid the need to remove the brake disk and consequently speed up the entire repair process and also, in addition, perform repair with greater precision.

It is necessary for these devices that the lathe applied to the wheel be subsequently aligned with the axis of the wheel hub because the lathe is mounted on the axle using the wheel hub itself.

However, the wheel hub, either because of manufacturing defects or due to the presence of rust that forms at the points where the fastening screws are tightened or due to deformation caused by excessive tightening of the heel fastening screws, is never perfectly aligned with its own axle and this runout must be corrected in order to turn the brake disk.

Known equipment for turning brake disks generally include a support on which the lathe is mounted, a motor that drives the disk to be turned and an alignment and compensation device. This device may be manual or automatic depending on the model of the device.

If the alignment device is the manual type then the machine operator corrects for runout detected by optical or electronic devices by correcting suitable manual adjusters that align the lathe axis with that of the disk in order to perform correct turning.

This system has the problem that the operator who uses it must have a great deal of experience in correcting compensation parameters. As a consequence it is not suited for personnel without special expertise.

In the automatic version correction is no longer done manually but is done using special automatic detection and adjustment devices.

The main problem these devices present is the difficulty they have in correctly detecting runout between the hub and the relative disk.

Brake resurfacing machines or brake lathes configured to resurface brake disks and brake rotors mounted to a vehicle wheel assembly are commonly referred to as on-car brake lathes. By eliminating the need to remove the brake disk or brake rotor from the vehicle wheel assembly, the overall efficiency of the resurfacing procedure is improved, and the chances for operator induced error are reduced. However, the resurfacing of brake disks and brake rotors which remain mounted to the vehicle wheel assembly requires that the on-car brake lathe and the vehicle wheel assembly, including the brake disk or brake rotor, be aligned along a common axis, typically, the axis of the vehicle wheel assembly hub onto which the on-car brake lathe is secured.

Often, the hub surface to which the vehicle wheel assembly mounts, is not aligned within a required tolerance to the axis of rotation for the axle upon which the vehicle wheel assembly is secured. This deviation between the hub surface and the axis of rotation for the wheel assembly is referred to as lateral runout, and must be compensated for either manually or automatically before beginning the resurfacing procedures with the on-car brake lathe.

Manual runout compensation procedures are tedious and complex. First, an operator secures the on-car brake lathe to the vehicle wheel hub using a suitable adapter. Next, a motor in the on-car brake lathe is activated to rotate the adapter and brake disk or brake rotor. Any runout present in the system is measured by one or more measurement devices, which provide the operator with a suitable visual indication representative of the actual runout experienced by the on-car brake lathe as the adapter is rotated through one or more complete rotations. Using the visual indication, the operator manually adjusts one or more mechanical adjustment elements, such as screws or dials, altering the rotational axis of the on-car brake lathe to reduce the observed runout to within an acceptable tolerance for performing the resurfacing of the brake disk or brake rotor.

To reduce the observed runout to within the desired tolerances using the manual runout compensation procedure usually requires several iterations when carried out by a skilled operator. The extra time spent by an operator to setup the on-car brake lathe and perform the manual runout compensation can substantially increase the time required to complete a brake disk resurfacing, resulting in a corresponding increase in cost and lost productivity.

Several solutions, such as that one relating to patents WO 98/10262 and WO 98/09754 registered on behalf of Joseph Willey, are known that have, for example, runout compensation devices where detection is performed by an accelerometer device which, after a certain number of revolutions, determines misalignment and the relative compensation plane to act on.

This system presents the problem of slowness in display of the amount of runout because the device must perform several revolutions to get in phase and determine the compensation plane even if runout is very small.

A number of on-car brake lathe devices have been configured with automatic runout compensation mechanisms which do not require significant operator input. One such automatic runout compensation mechanism is shown in U.S. Pat. No. 6,101,911 to Newell et al. (the '911 Newell et al. patent). The automatic runout compensation mechanism shown in the '911 Newell et al. patent includes at least one adjustment disc interposed between a pair of adapters and which is concentric about a axial drive shaft. The on-car brake lathe motor and cutting elements are secured to one adapter, and the entire mechanism secured to the vehicle wheel hub via the second adapter. The adjustment disc includes a slanted surface in engagement with either a second adjustment disc having an opposing slanted surface or one of the adapters. An adjustment mechanism is utilized to alter the rotational orientation of the adjustment disc about the axis of the axial drive shaft. Runout is detected by a rotational accelerometer, which provides control signals to the adjustment mechanism. Alteration of the rotation position of the adjustment disc about the axis of the axial drive shaft compensates for the detected runout by altering the angle at which the two slanted surfaces are engaged, and correspondingly the angle between the first and second adapters.

The adjustment mechanism of the '911 Newell et al. patent associated with the use of the one or more slant discs is a complex mechanical arrangement, requiring initial phasing of the adjustment discs and a lengthy trial-and-error adjustment process to compensate for any detected runout.

Accordingly, there is a need for on-car brake lathes having improved automatic runout compensation mechanisms, and which can quickly and accurately compensate for detected runout.

SUMMARY OF THE INVENTION

The object of the present invention is to achieve an automatic runout compensation device for brake disk turning equipment which includes a system that is able to perform real detection of runout because it employs a direct feeler type of system and does not use an accelerometer device.

The innovation in question, as part of this general object, proposes use of a system that displays the amount of runout both during realignment and at the end.

The device according to the innovation offers the advantage of reducing alignment times because the aligning joint, since it can be zeroed before application, starts compensating from the very start of rotation unlike the known devices that must dedicate several revolutions to get in phase before they start.

In addition, according to the innovation and thanks to the possibility of zeroing the screws, alignment time becomes proportional to the runout that is detected so that realignment is practically instantaneous in case of small runout.

Another advantage of the innovation is the fact that no special attention is required when tightening the screws that fasten the lathe to the vehicle's hub. These can be tightened all the way without fear of blocking the alignment mechanism.

The above-mentioned objects and advantages are all achieved, according to the invention, by a device for turning brake disks or the like that includes an automatic runout compensation unit, characterized by the fact that a special runout detecting device, at least one device for elaborating the centering device control signals and a special aligning joint are installed on the support that can be mounted on the hub of the vehicle and by the fact that this runout detecting device is composed of a linear movement detector preferably of the type with an electronic comparator using LVDT technology or the like.

Briefly stated, the present invention provides an on-car brake lathe system for the resurfacing of a brake disk or brake rotor which remains mounted to a vehicle wheel assembly. The on-car brake lathe system includes a lathe body, a drive motor, a cutting head, and a mounting chuck driven by the drive motor. The on-car brake lathe system further includes an aligning joint having a pair of mounting flanges concentrically disposed about the rotational axis of the mounting chuck, one of which is secured to the mounting chuck, and the other of which is configured for securing the on-car brake lathe system to a vehicle wheel assembly. An automatic runout compensation mechanism is disposed between the pair of flanges, securing the first flange and the second flange together at an adjustable inclination or alignment angle. The automatic runout compensation mechanism includes three discrete adjustment elements equidistantly disposed about the mounting chuck rotational axis, and is configured to adjust the relative inclination or alignment angle between the pair of flanges to provide runout compensation between the rotational axis of the drive shaft and the rotational axis of the vehicle wheel assembly.

In an embodiment of the on-car brake lathe system of the present invention, each adjustment element includes two opposing surfaces, each having an opposed helical channel, between which are contained a number of ball bearings. At least one of the opposing surfaces and corresponding helical channels is configured for controlled rotation about a central axis aligned parallel to the chuck rotational axis. As the opposing surface and helical channel rotate about the central axis, the ball bearings maintain a minimum spacing between the opposed helical channels, varying the spacing between the opposing surfaces in direct relation to the depth of the rotated helical channel. Displacement of the spacing between the opposing surfaces alters the relative alignment angle between the pair of flanges, providing for runout compensation.

In an embodiment of the on-car brake lathe system of the present invention, a linear variable differential transformer (LVDT) device is provided to generate signals representative of runout present in the mounting of the on-car brake lathe to a vehicle wheel hub. The signals representative of the detected runout are utilized to control the adjustment of each of the discrete adjustment elements to reduce the detected runout to within a required tolerance.

The foregoing and other objects, features, and advantages of the invention as well as presently preferred embodiments thereof will become more apparent from the reading of the following description in connection with the accompanying drawings.

BRIEF DESCRIPTION OF THE DRAWINGS

Other characteristics and details of the innovation can be better understood from the following description, given as an example and not limiting, as well as by the attached drawings where.

Corresponding reference numerals indicate corresponding parts throughout the several figures of the drawings.

DESCRIPTION OF THE PREFERRED EMBODIMENTS

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
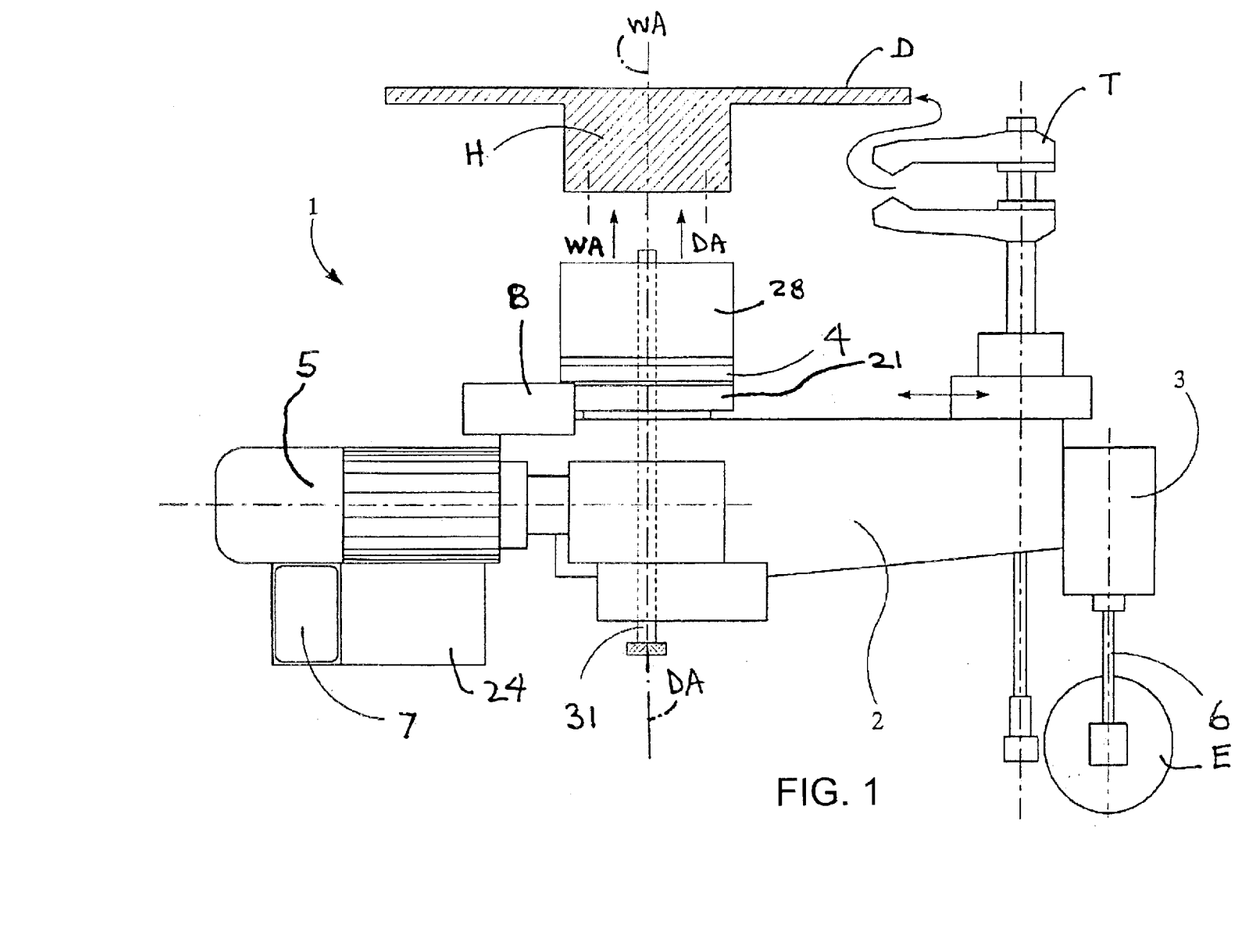
FIG. 1 illustrates an overall layout of the device for turning brake disks applied directly on the hub of the vehicle.

Turning to FIGS. 1–4, the following provides a general description of the on-car brake lathe of the present invention. The number 1 is used, with reference to FIG. 1, to indicate the overall assembly of the device for turning brake disks D or the like including an automatic runout compensation unit according to this innovation which device is basically composed of support structure 2 that carries, respectively:

a) a special runout detecting device or mechanism, indicated by number 3;

b) a device for elaborating the control signals to send to the centering device;

c) a special aligning joint indicated as a whole by the number 4 and driven by motor 5.

As seen in FIG. 1, on-car brake lathe 1 of the present invention is shown in relation to a vehicle wheel brake disk or brake rotor D to be resurfaced. The on-car brake lathe 1 includes a support structure 2, onto which is mounted a drive motor 5, an adjustable cutting head T, a mounting chuck 21, and a runout detecting device 3. Additionally included on the support structure 2 is a control panel 24 including a microprocessor card acting as a processing apparatus for processing control signals for the detecting device or means 3. Control panel 24 provides one or more operator controls and an associated display 7 which is linked to the microprocessor card. Display 7 is preferably a histogram-type display, composed of a row of light emitting diodes (LEDs) or similar device, or alternatively, a digital-type display providing an indication of the amount of runout detected by the runout detecting device 3. The drive motor 5 is coupled to the mounting chuck 21 through a drive mechanism (not shown) contained within the support structure 2, to rotate the mounting chuck 21 about a drive axis DA. An aligning joint 4 is secured to the mounting chuck 21, concentric with the drive axis DA.

To detachably secure the brake lathe 1 to a vehicle wheel brake disk or brake rotor H to be resurfaced, an adapter 28 is secured to the vehicle wheel brake disk or brake rotor H using the vehicle wheel lug nuts or retaining bolts (not shown). Next, the brake lathe 1 is moved into position such that the aligning joint 4 and drive axis DA are substantially in line with a central axis of the adapter 28, corresponding to the rotational axis WA of the vehicle wheel brake disk or brake rotor H. A threaded retaining shaft 31 is passed axial through the support structure 2 and mounting chuck 21, and engaged with an axial threaded receiving bore (not shown) in the adapter 28. Tightening of the threaded retaining shaft seats the adapter 28 against the aligning joint 4, and secures the brake lathe 1 to the vehicle wheel brake disk or brake rotor H to be resurfaced.

The runout detecting device 3 basically consists of a linear movement detector meaning an electronic comparator preferably using LVDT technology or the like, that is firmly fastened to the lathe 1 in a position suitably distant from the rotation axis of aligning joint 4 in order to amplify the effect of the runout.

The detecting device also includes reference element 6 applied each time to the chassis E of the vehicle or to another fixed part and that is positioned in contact with the mobile element of the movement detector.

The mobile part of the detector, that consists of a cylindrical cursor, is therefore cyclically moved a distance proportional to the runout during rotation of the lathe axis.

The detector, that also acts as a transducer, transforms the amount of movement into an electrical signal that varies in amplitude and direction depending on the amount and direction of the movement.

The appliance for elaborating the signals and for controlling the centering device consists of a "custom" programmed electronic circuit or microprocessor card used to elaborate the signals coming from the detector and to control an electromagnetic type of linear actuator 8 that acts on a triad of rotary units that adjust the distance between the two faces of alignment device 4.

This device is also furnished with a histogram-type display, made using a row of LEDs or similar devices or a digital-type display that shows the amount of runout while alignment is being performed.

Aligning joint 4 is composes of two flanges 9 and 10 connected one (flange 10) to the axis or chuck DA of the lathe and the other (flange 9) to the vehicle's hub and facing each other through a connection that allows the relative inclination of the faces to be varied. The lathe has a tool T for turning disk D on support 2.

This joint is quipped with an electromagnetic type of linear actuator able to act on the devices that vary the relative inclinations of the faces in function of the controls received from the equipment.

Figure 2:
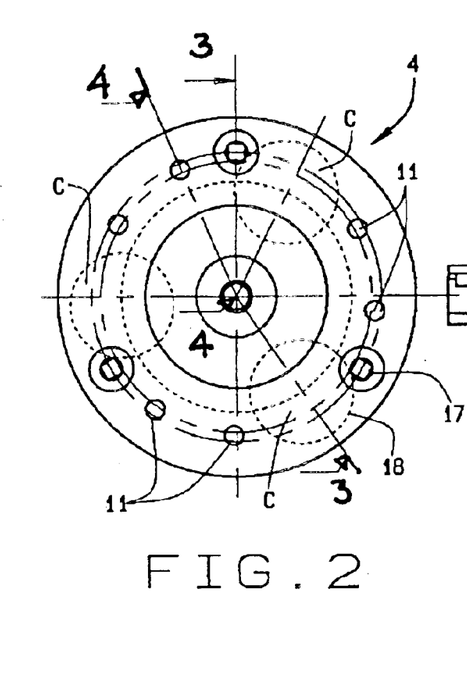
FIG. 2 schematically illustrates an aligning joint according to the innovation and seen from the front.
Figures 3, 4:
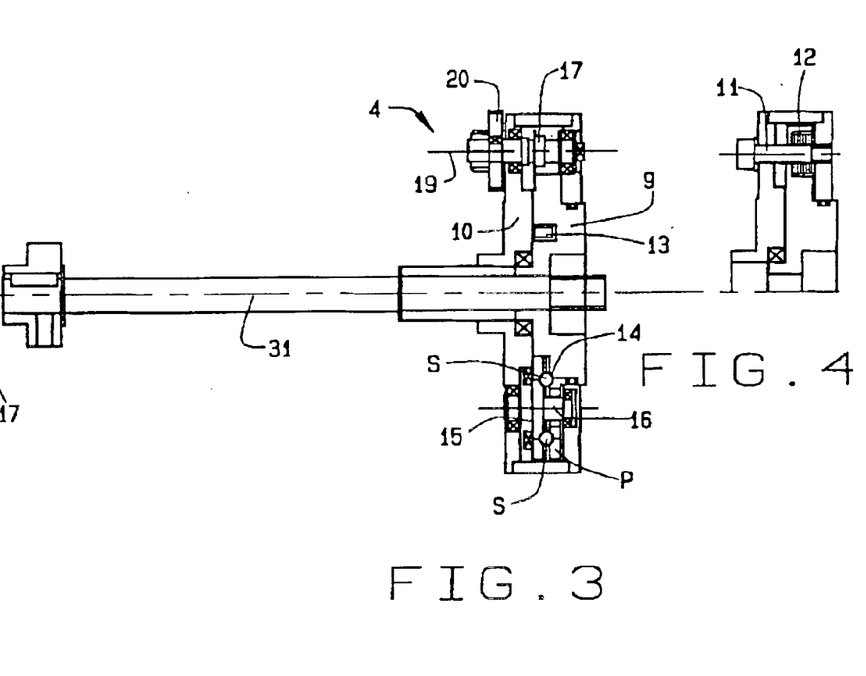
FIG. 3 is a schematic sectional view of an aligning joint of the innovation taken along line 3—3 of FIG. 2.
FIG. 4 is a schematic sectional view of an aligning joint in the innovation taken along line 4—4 of FIG. 2.

More specifically, as illustrated in FIGS. 2 to 4, the aligning joint consists of two half-joints in the form of flanges 9 and 10 that face each other across three contact points indicated by the letter C and mutually placed at 120 degree intervals.

The two half-joints are held in mutual adherence by six screws 11 and six sets of Belleville washers 12 whereas drive transmission takes place through stake 13.

Each of the three points of contact C on flange 9 consists of a female lead nut 14 in the form of an annular groove having a varying depth groove in a part P, the length of which corresponds to a single rotation of a cylindrical propeller of suitable pitch, for example 0.6 mm and balls S between groove 14 and a complementary screw 15, also in the form of an annular groove of varying depth on the opposite flange 10, of screw 15 with the same length as lead nut 14.

The screw can rotate around pin 16 applied to flange 10.

When screw 15 is rotated its thread rises or lowers sliding on the thread of lead nut 14.

This creates detachment in case of unscrewing and approach in case of screwing.

A row of suitable diameter balls (for example 5.5 mm) has been inserted between screw and lead nut in order to reduce the friction generated by this maneuver.

Design is such that if all three screws 15 are screwed all the way in the opposite faces of the two flanges 9 and 10 are parallel because the two flanges rest against each other. This zero condition is achieved by the machine operator, using suitable wrench, before starting the alignment process.

The two faces become inclined with respect to each other by rotating even just one of the three screws 15.

Since these screws are placed at 120 degrees intervals then any relative orientation can be obtained by suitably and variably rotating all three of the screws.

These screws have been demultiplied by a pair of gears (pinion 17 and ring gear 18) to achieve greater precision in rotation of the screws by a force external to the joint. Gear or toothed wheel 20 has also been applied to shaft 19 of pinion 17 equipped with a sawtooth extension that can be driven by an external actuator.

It is now easily understood, by the way the relative orientation of the two half-joints can be varied, how this relative orientation can be achieved while the joint is rotating.

In fact it is sufficient for the actuator to enter into the trajectory of a gear in order to obtain variation of the orientation plane.

The desired alignment, thanks to the combined effect of the runout detector and the elaboration and actuator drive equipment, can be achieved in just a few seconds.

We shall now briefly describe an example of operation of the compensation device illustrated above.

The axis is made to rotate by motor 5 once lathe 1 has been mounted on the vehicle's hub H, and the fixed reference part for sensor 3 has been applied.

The exact moment the sensor detects maximum displacement the actuator automatically intervenes on the adjustor, so to reduce this amount acting on one of the three contact points on flange 9.

In a short time the actuator, acting on all three adjustors, inclines the two flanges of the alignment device relative to each other in order to reach minimum displacement values.

For example displacement values can be considered lower than a real amount of 0.04 mm equal to 0.0016 inch.

As mentioned above the device according to the innovation offers the advantage of reducing alignment times because the aligning joint, which can be zeroed prior to application, starts compensating immediately when it begins to rotate, unlike devices which, because they usually start with a random element, need several rotations before they start entering into phase.

Another important advantage of the innovation compared to known solutions is due to the fact that, thanks to the possibility of zeroing the screws, alignment time becomes proportional to the amount of runout that is detected so that realignment is practically immediate for cases of only slight runout.

Turning next to FIGS. 5–13, the aligning joint 4 of the present invention is described in greater detail. The aligning joint 4 comprises the front flange 9, configured to seat against the adapter 28 (FIG. 1) and a rear flange 10 configured for attachment to the mounting chuck 21 with one or more retaining bolts 22. A cylindrical housing 240 seats in a peripheral recess 26 on the rear flange 10, and encloses the outer circumference of the aligning joint 4. The cylindrical housing 240 is secured to the aligning joint 4 by an overlapping edge 280 of an annular face plate 30. As will be described below in greater detail, the front flange 9 is connected to the rear flange 10 through a connection configured to permit adjustment of the relative inclination of front flange 9 and rear flange 10.

Figures 6, 8, 9, 10, 13:
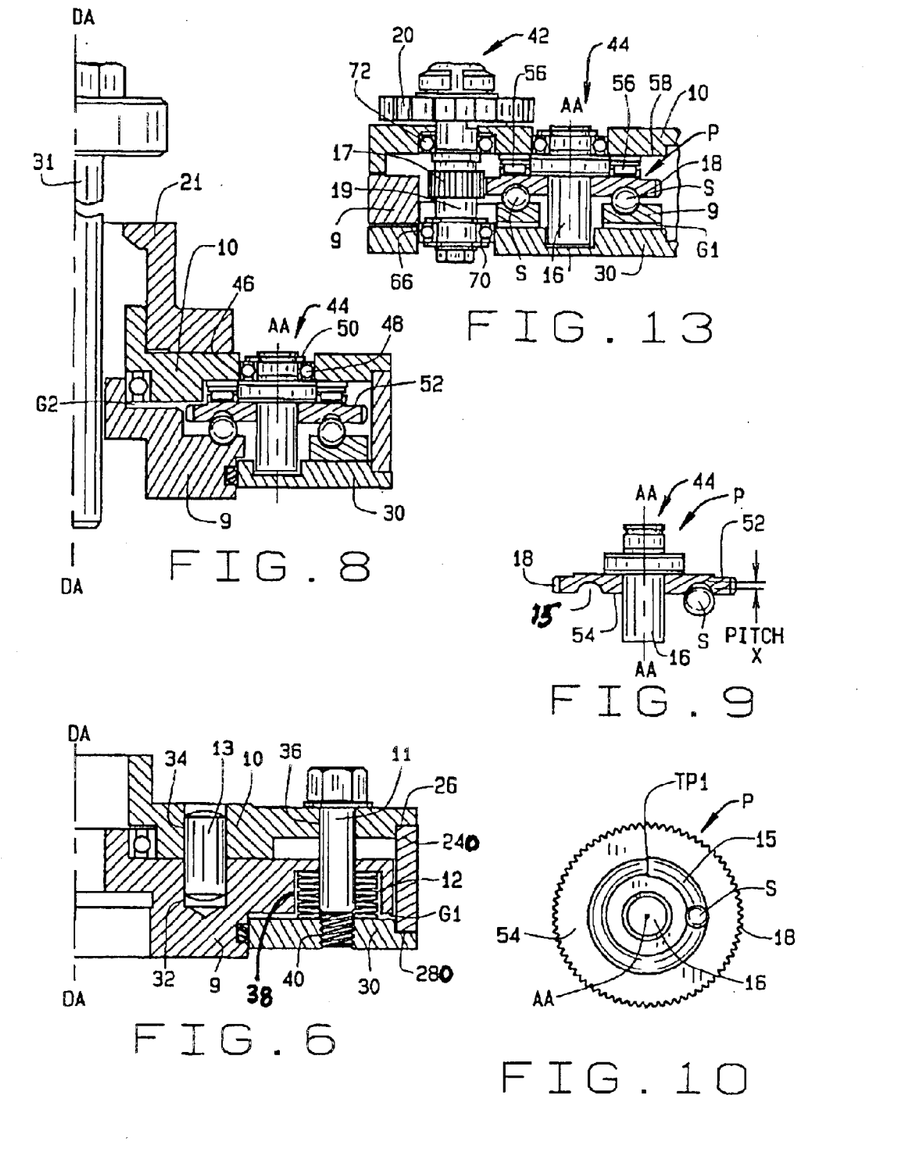
FIG. 6 is a sectional view of the aligning joint taken along line 6—6 of FIG. 5, illustrating the drive coupling and retaining bolts, and being inverted with respect to the showing of FIG. 1 so that the brake hub H of FIG. 1 would be below FIG. 6.
FIG. 8 is a sectional view of the aligning joint shown in FIG. 7, illustrating the adjustment mechanism in a maximum inclination position.
FIG. 9 is a sectional view of the adjustment mechanism gear, illustrating the helical channel pitch.
FIG. 10 is a top view of the adjustment mechanism gear, illustrating the helical channel.
FIG. 13 is a sectional view of the aligning joint taken along line 13—13 of FIG. 5, illustrating an adjustment mechanism and actuation mechanism in a "zero" inclination position.

As seen in FIG. 6, drive transmission from the mounting chuck through the rear flange 10 is conveyed to the front flange 9 through a stake or drive pin 13. Drive pin 13 seats partially within a recessed bore 32 in the front flange 9, and partially within a passage 34 in the rear flange 10. Drive pin 13 is constrained by the recessed bore 32 and passage 34 against lateral or radial movement, but is permitted to move parallel to the drive axis, so as not to impede adjustment of the relative inclination of the front flange 9 and the rear flange 10.

Further shown in FIG. 6, front flange 9 and rear flange 10 are secured in mutual adherence by a set of retaining screws or bolts 11 which pass through bores 36 in the rear flange 10, bores 38 in the front flange 9, and thread into threaded bores 40 in the annular face plate 30. Disposed about each of the retaining screws 11, between the annular face plate 30 and the front flange 9 are sets of Belleville washers 12. In the embodiment shown in FIG. 2, six sets of retaining screws or bolts 11 are utilized, with each set of Belleville washers 12 consisting of eight individual Belleville washers.

Each set of Belleville washers 12 exerts a preload force between the front flange 9 and the annular face plate 30, which is constrained by the retaining screws 11 to the rear flange 10. The preload force urges the front flange 9 towards the rear flange 10, such that the front flange 9 is spaced apart from the annular face plate 30 by a gap G1 (FIG. 13). As is readily apparent to one of ordinary skill in the art, the front flange 9 is secured in mutual adherence to the rear flange 10 through a connection configured to permit adjustment of the relative inclination of front flange 9 and rear flange 10 through the compression of one or more sets of Belleville washers 12, and a reduction in the size of gap G1.

Figure 5:
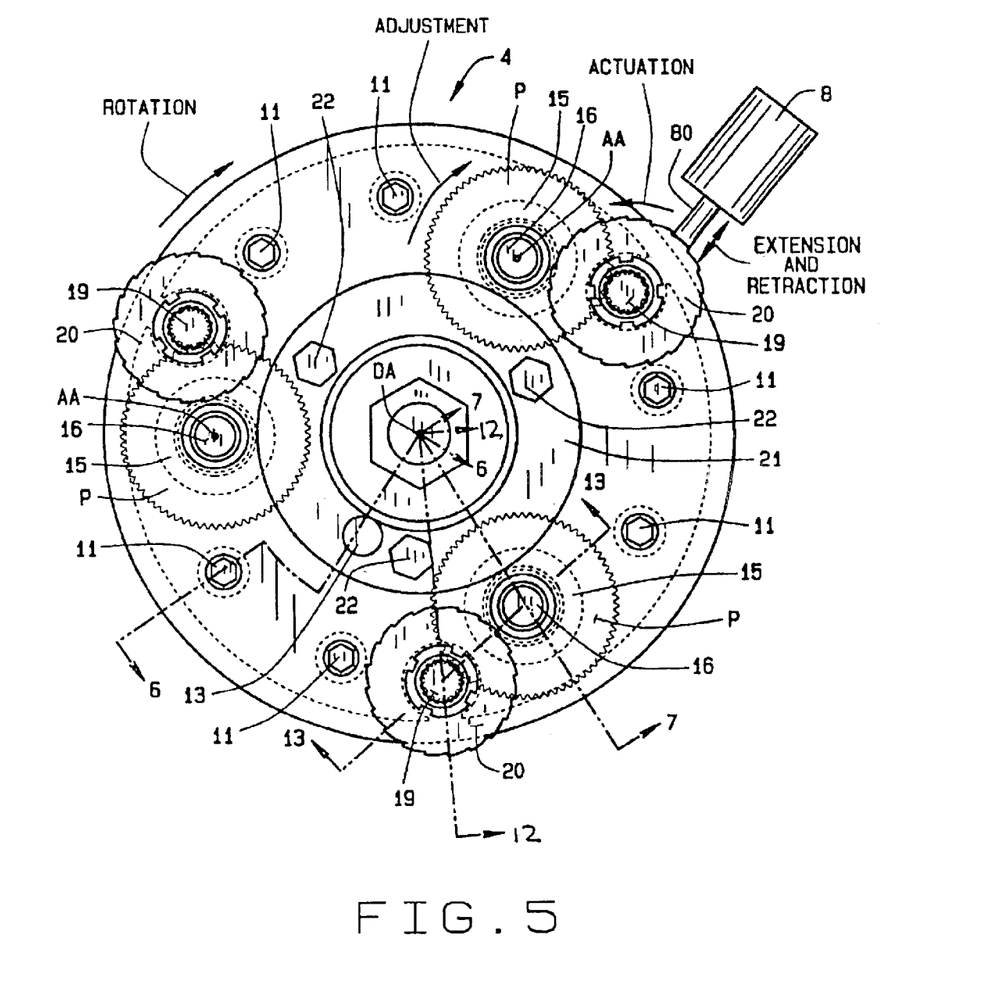
FIG. 5 is a rear view of the aligning joint of FIG. 2, secured to a mounting chuck.

Turning to FIGS. 7 to 11, an automatic runout compensation mechanism is shown generally at 42, consisting of at least one adjustment element 44 disposed between the front flange 9 and the rear flange 10. Adjustment element 44 is configured to compress one or more sets of Belleville washers 12 by exerting a force parallel to the drive axis DA, separating the front flange 9 from the rear flange 10 in a non-uniform manner. Non-uniform separation of the front flange 9 from the rear flange 10 results in a change in the relative inclination or alignment angle between the front flange 9 and the rear flange 10. Preferably, as is shown in FIG. 5, three adjustment elements 44 are circumferentially disposed equidistantly about the drive axis DA, at 120 degree intervals.

Figure 7:
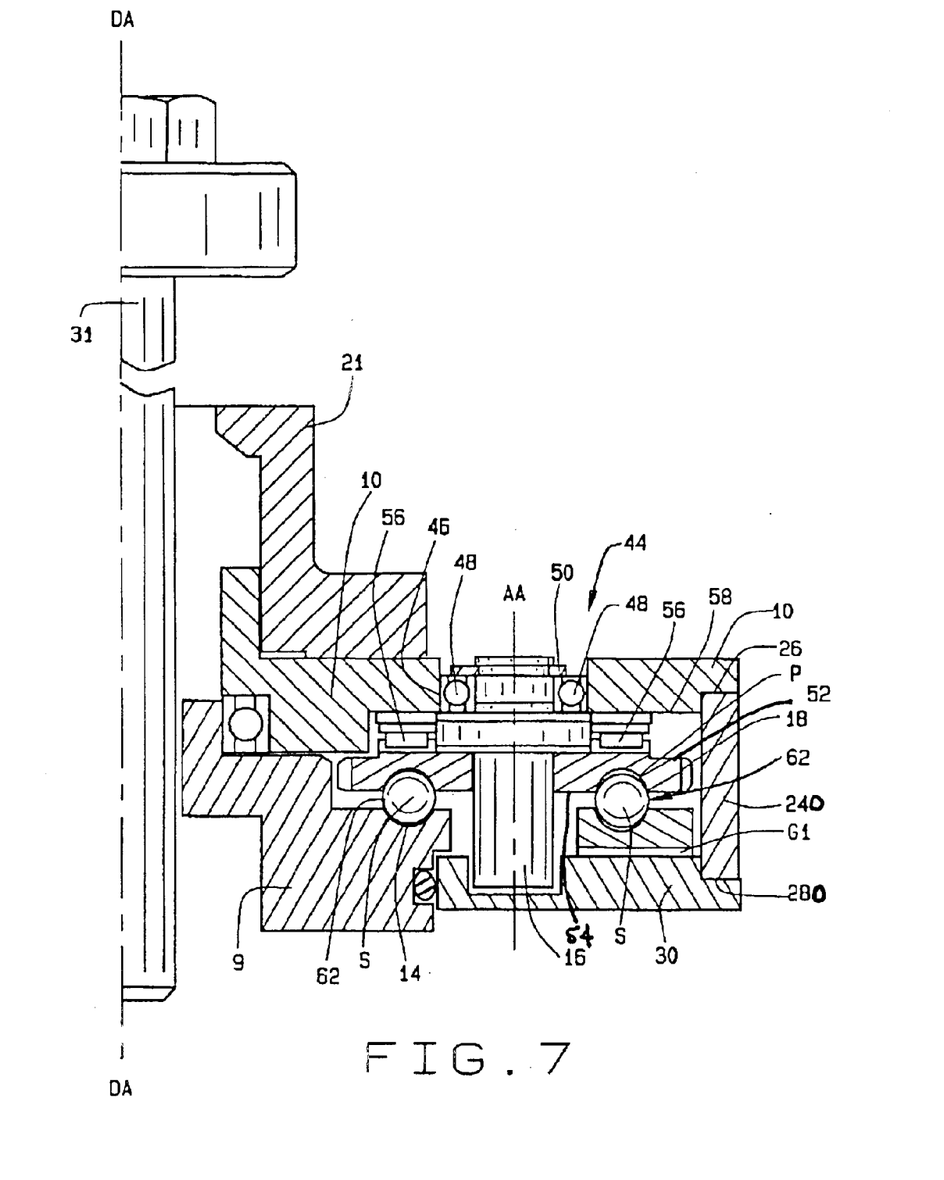
FIG. 7 is a sectional view of the aligning joint taken along line 7—7 of FIG. 5, illustrating an adjustment mechanism in a "zero" inclination position and likewise being inverted as is the case for the remaining sectional views.

Each adjustment element 44 consists of a pin or shaft 16 passes through a bore 46 in the rear flange 10, with a longitudinal axis of rotation AA parallel to the drive axis DA. A ring bearing structure 48 is disposed within the bore 46, and the pin or shaft 16 is secured for rotational movement within the bearing structure 48 by a snap-ring 50. A gear 18 is secured about the pin or shaft 16 between the rear flange 10 and the front flange 9, perpendicular to the drive axis DA. Gear 18 has a radial dimension greater than the radial dimension of the pin or shaft 16, defining a rear face 52 and a front face 54. A set of roller bearings 56 are disposed between the rear face 52 of gear 18 and the front face 58 of the rear flange 10.

A helical channel 15 of uniform pitch, occasionally referred to as a screw or female screw by those skilled in the art, is formed in the front face 54 of the gear 18, concentric with the axis AA of pin or shaft 16. Helical channel 15 has a depth or pitch X, as seen in FIGS. 9 and 10 which varies about the circumference of the helical channel 15.

Figure 11:
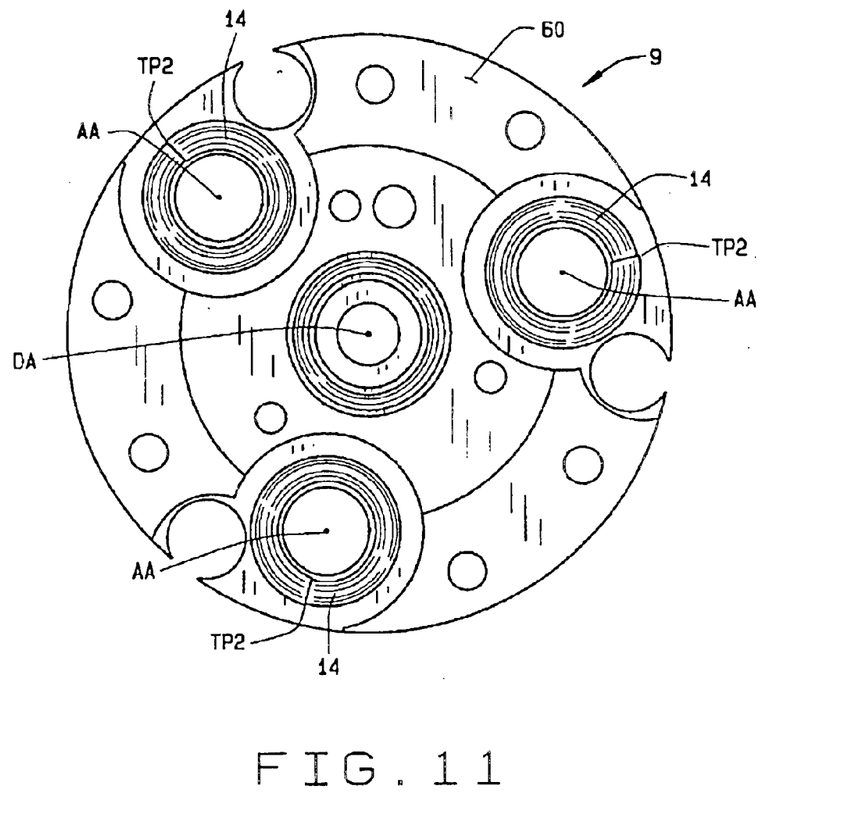
FIG. 11 is a rear view of the front flange, illustrating the second helical channels.

A lead nut or second helical channel 14 having an identical depth or pitch X, as seen in FIG. 11 is integrally formed in the rear face 60 of the front flange 9, opposite each helical channel 15. Each helical channel 15 and opposed second helical channel 14 define a generally helical passage 62 between the rear face 60 of the front flange 9 and the front face 54 of gear 18. Disposed within each helical passage 62 are a number of suitably sized ball bearings S having a diameter fitted to the deepest portion of the helical channel 15. Preferably, twelve ball bearings S seat within helical passage 62, providing a reduced friction sliding and/or rolling surface between the helical channel 15 and the second helical channel 14.

Rotation of gear 18 about axis AA of the pin or shaft 16 causes the first helical channel 15 in face 54 to correspondingly rotate about axis AA. The second helical channel 14 opposed to first helical channel 15 is integrally formed in the rear face 60 of the front flange 9, and as such, cannot rotate about axis AA. Absent the presence of the ball bearings S in the helical passage 62 defined between channels 15 and 14, the diameter of the helical passage 62 is altered in direct proportion to the rotation of the first helical channel 15 about axis AA.

As seen in FIG. 7, in an initial or "zero" inclination position, helical channel 15 and second helical channel 14 are aligned such that the helical passage 62 has a generally uniform diameter within which ball bearings S are constrained, i.e. the transition point TP1 in helical channel 15 between the portion having the greatest depth and the portion having the shallowest depth is aligned with the transition point TP2 in second helical channel 14 between the portion having the greatest depth and the portion having the shallowest depth. In this position, front flange 9 is parallel to, and in contact with, rear flange 10.

As the helical channel 15 is rotated about axis AA by gear 18, the alignment between transition point TP1 and TP2 is removed. Progressively shallower portions of each helical channel 15, 14 are rotated into alignment with each other until a "maximum" inclination adjustment position is reached, shown in FIG. 8, in which the shallowest portion or each helical channel 15, 14 is in alignment. At the point of "maximum" inclination, helical passage 62 would have a non-uniform diameter absent the presence of ball bearings S. Continued rotation of gear 18 about axis AA past the point of "maximum" inclination returns the adjustment element 44 to the initial position or point of "zero" inclination.

The presence of ball bearings S in the helical passage 62 provides a wedge or cam action between helical channel 15 and second helical channel 14 directed parallel to axis AA, maintaining a separation distance between helical channel 15 and second helical channel 14 equal to the diameter of each ball bearing S. Gear 18 upon which helical channel 15 is formed is restrained from movement along axis AA in a first direction by snap-ring 50, and from movement along axis AA in the opposite direction by roller bearings 56. Accordingly, the wedge or cam action of ball bearings S resulting from the rotation of gear 18 and helical channel 15 about axis AA results in the tilting of front flange 9, within which second helical channel 14 is formed, away from helical channel 15 and rear flange 10. This tilting can be seen by the presence of gap "G1" between the front flange 9 and the annular face plate 30 in FIG. 7, and the absence of gap "G1" between the front flange 9 and the annular face plate 30 in FIG. 8, and the presence of opposing gap "G2" between the front flange 9 and the rear flange 10.

Figure 12:
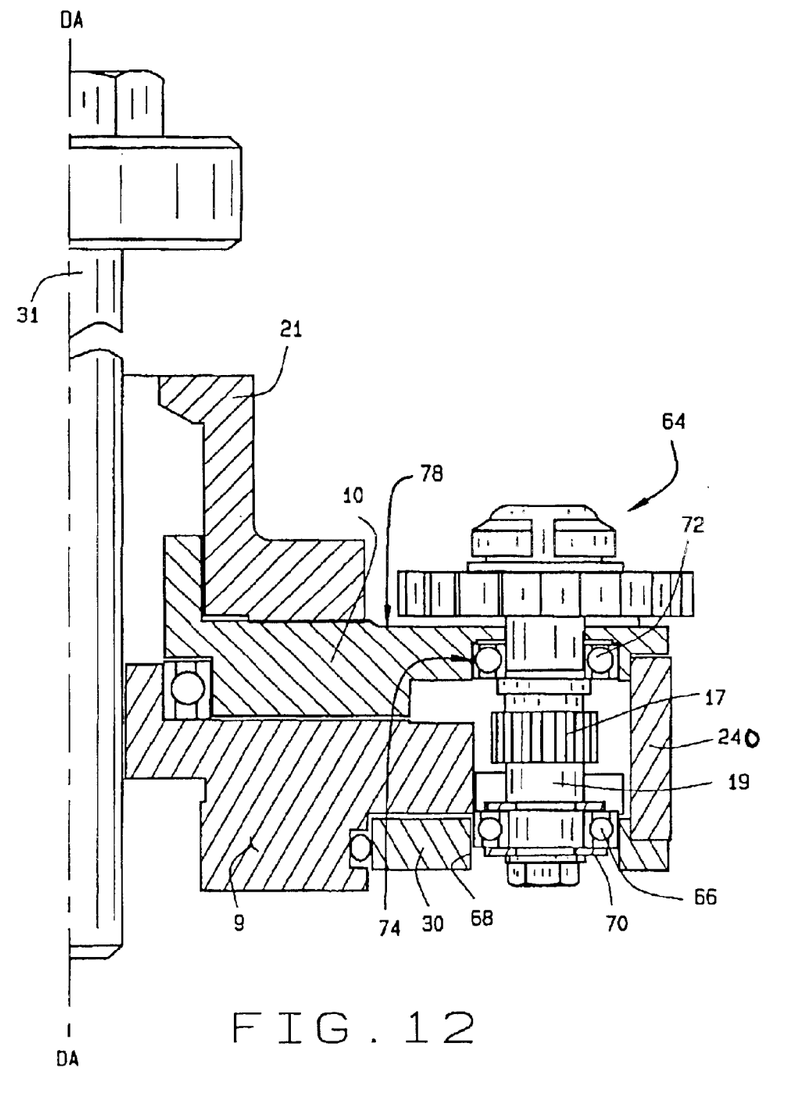
FIG. 12 is a section view of the aligning joint taken along line 12—12 of FIG. 5, illustrating the actuation mechanism.

Turning to FIGS. 12 and 13, an actuation mechanism 64 is shown for engagement with gear 18. Preferably, each alignment element 44 is associated with an individual actuation mechanism 64. Actuation mechanism 64 comprises a shaft 19 disposed parallel to pin or shaft 16. Shaft 19 seats within a ring bearing 66 disposed in a bore 68 in annular face plate 30. A snap-ring 70 restrains shaft 19 from axial motion through ring bearing 66. Shaft 19 further seats within a ring bearing 72 disposed in a bore 74 in rear flange 10. A portion of shaft 19 extends through ring bearing 72 and beyond the rear face 78 of rear flange 10.

Pinion gear 17 is disposed about shaft 19, between front flange 9 and rear flange 10, and in engagement with gear 18. Pinion gear 17 is selected such that the engagement between pinion gear 17 and gear 18 provides a de-multiplier effect to achieve greater precision in the rotation of gear 18 about axis AA, and correspondingly, in the wedge or cam action exerted to incline the front flange 9.

To provide for a rotational force on shaft 19, tooth wheel or gear 20 is secured to the portion of shaft 19 extending beyond the rear face 78 of rear flange 10. Wheel 20 is selectively engaged with a retractable actuator pin 80 from an external actuator 8. Each engagement between retractable actuator pin 80 and wheel 20 ratchets the wheel 20 about the rotational axis of shaft 19, driving pinion gear 17, resulting in the rotation of gear 18 about axis AA.

During operation, as shown in FIG. 5, each complete rotation of the aligning joint 4 about axis DA in the direction of the arrow labeled "ROTATION" brings each actuation mechanism 64 and associated wheel 20 past external actuator 8 one time. If retractable actuator pin 80 is extended, the rotation of the aligning joint 4 brings wheel 20 into engagement with retractable actuator pin 80, such that wheel 20 rotates in the direction of the arrow labeled "ACTUATION" as the rotation of aligning joint 4 continues. A corresponding rotation occurs in gear 18 in the direction of the arrow labeled "ADJUSTMENT", altering the inclination angle between the front flange 9 and the rear flange 10 of the adjustment joint 4.

The lathe in question employs a microprocessor card to perform automatic alignment between the axis of the lathe and the axis of the wheel.

At start-up the flange of the machine is in rotation together with the brake disk at a frequency equal to the 50 Hz or 60 Hz power grid frequency, with automatic measurements being made by the control card.

The alignment error is measured through a linear transfer transducer (composed of a differential transformer (LVDT) and a central core the position of which generates a signal proportional to its position) and is converted into a sinusoidal wave with a frequency equal to the rotation frequency of the flange and with amplitude proportional to the mount of error. Since one sinusoidal wave period corresponds to one revolution of the flange (and the disk) there are two key pieces of information that can be measured from this wave: the amount of error and the position of the maximum error within a space of 360 degrees.

Correction is performed by an actuator that acts on one of the three gears spaces at 120 degree intervals and positioned on the flange. The actuator, to be sure to act on at least one of these gears, must be controlled for a time interval equal to a 120 degree rotation of the disk. This duration of this time interval is calculated by the microprocessor based on grid frequency at the start of the correction cycle. This duration remains the same for the entire work cycle.

The choice of which gear to act on is made based on the maximum position of the sinusoidal wave within the period.

During the correction cycle one period is used by the microprocessor to acquire the error sinusoidal wave and the next period is used to make the actual correction by controlling the actuator 8.

The correction cycle terminates when the amplitude of the sinusoidal wave drops below a certain threshold, preset by software. In reality there are two thresholds: the operator can choose whether to be satisfied by a first correction, always in any case within the tolerances prescribed by the vehicle manufacturers' specifications, or whether to try to achieve a lower threshold, better suited to high speed and sporting vehicles.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. An on-car, brake lathe system for resurfacing a brake disk of a vehicle brake assembly, the on-car brake lathe system comprising:

a support structure securing a drive motor;

an adjustable cutting head;

a mounting chuck rotationally driven about a drive axis by the drive motor;

a sensor secured to said support structure, said sensor configured to produce a signal indicative of movement of said support structure relative to a fixed reference;

a microprocessor configured to receive said signal and to produce a control signal using said received signal;

an aligning joint secured to said mounting chuck concentric to said drive axis, said aligning joint including:

a front mounting flange secured coaxially to said mounting chuck;

a rear mounting flange adjustably secured coaxially to said front mounting flange at an adjustable inclination; and at least one adjustment element disposed between said front and rear mounting flanges radially outward from said drive axis, said at least one adjustment element configured to alter an inclination between said front and rear mounting flanges, said at least one adjustment element having an adjustment axis parallel to said drive axis; and an adjustment mechanism connected to receive said control signal from said electronic controller and configured to engage in a first position, said at least one adjustment mechanism to rotate said at least one adjustment element about said adjustment axis in response to said control signal;

said at least one adjustment element including:

a pin secured between said front and rear mounting flanges for rotational movement about said adjustment axis;

a gear secured about said pin, said gear having a first face disposed adjacent to said front mounting flange, and a second face disposed adjacent to said rear mounting flange, said second face including a screw defining a first helical channel concentric with said pin;

a second helical channel disposed on said rear mounting flange, said second helical channel axially aligned with said first helical channel, said first and second helical channels defining a helical passage;

a plurality of ball bearings disposed within said helical passage; and wherein said plurality of ball bearings define an wedge between said first and second helical channels such that rotation of said screw about said pin alters a separation distance between said front and rear mounting flanges.

2. The on-car, brake lathe system of claim 1, wherein said at least one adjustment element further includes:

a shaft disposed parallel to said pin, a portion of said shaft extending beyond a rear surface of said front mounting flange;

a pinion disposed about said shaft, said pinion in engagement with said gear, such that rotation of said pinion about an axis of said shaft results in rotation of said gear and screw about an axis of said pin;

a pawl disposed about said shaft adjacent said rear surface of said front mounting flange, said pawl configured to engage said adjustment mechanism in a first position during a rotation of said mounting flange about said drive axis; and wherein engagement of said pawl and said adjustment mechanism in a first position results in rotation of said pawl, said shaft, and said pinion about an axis of said shaft, and a corresponding rotation of said gear about an axis of said pin.

3. A method for runout compensation between a vehicle wheel hub and an on-car, brake lathe system having an aligning joint comprising a front mounting flange secured to said on-car brake lathe system concentric to a drive axis, a rear mounting flange adjustably secured coaxially to said front mounting flange at an adjustable inclination, and at least one adjustment element disposed between said front and rear mounting flanges radially outward from said drive axis, said at least one adjustment element including a pin secured between said front and rear mounting flanges for rotational movement about said adjustment axis; a gear secured about said pin, said gear having a first face disposed adjacent to said front mounting flange, and a second face disposed adjacent to said rear mounting flange, said second face including a screw defining a first helical channel concentric with said pin; a second helical channel disposed on said rear mounting flange, said second helical channel axially aligned with said first helical channel, said first and second helical channels defining a helical passage; and a plurality of ball bearings disposed within said helical passage, the method comprising:

rotating said gear about said adjustment axis to rotate said plurality of ball bearings disposed within said helical passage about said adjustment axis;

utilizing said plurality of ball bearings to maintain a minimum spacing between said first helical channel and said second helical channel; and wherein said minimum spacing is maintained by inclining said front mounting flange and said rear mounting flange responsive to said rotation of said gear about said adjustment axis.

4. The method for runout compensation of claim 3, further including the step of establishing said front mounting flange and said rear mounting flange in a parallel configuration.

5. The method for runout compensation of claim 3, further including the steps of measuring runout in relationship to a fixed reference, and utilizing said measured runout to control rotation of said gear.

6. The method for runout compensation of claim 3, further including initially zeroing the aligning joint.

7. An aligning joint apparatus for runout compensation between a vehicle wheel hub and an on-car, brake lathe system having the aligning joint apparatus, the apparatus comprising:

a front mounting flange secured to said on-car brake lathe system concentric to a drive axis;

a rear mounting flange adjustably secured coaxially to said front mounting flange at an adjustable inclination;

at least one adjustment element disposed between said front and rear mounting flanges radially outward from said drive axis;

said at least one adjustment element comprising:

a pin secured between said front and rear mounting flanges for rotational movement about said adjustment axis;

a gear secured about said pin;

said gear having a first face disposed adjacent to said front mounting flange and a second face disposed adjacent to said rear mounting flange;

said second face including a screw defining a first helical channel concentric with said pin;

a second helical channel disposed on said rear mounting flange;

said second helical channel axially aligned with said first helical channel;

said first and second helical channels defining a helical passage; and a plurality of ball bearings disposed within said helical passage so that rotating said gear about said adjustment axis rotates said plurality of ball bearings disposed within said helical passage about said adjustment axis, said plurality of ball bearings maintaining a minimum spacing between said first helical channel and said second helical channel, and said minimum spacing being maintained by inclining said front mounting flange and said rear mounting flange responsive to said rotation of said gear about said adjustment axis.

8. The apparatus of claim 7, further including said front mounting flange and said rear mounting flange being in a parallel configuration.

* * * * *

UNITED STATES PATENT AND TRADEMARK OFFICE
CERTIFICATE OF CORRECTION

PATENT NO. : 6,813,979 B2
DATED : November 9, 2004
INVENTOR(S) : Alberto Caorle

It is certified that error appears in the above-identified patent and that said Letters Patent is hereby corrected as shown below:

<u>Title page,</u>
Item [73], Assignee, should read:
-- Costruzioni Meccaniche Caorle S.p.A., Vicenza (IT) --

Signed and Sealed this

Fifteenth Day of March, 2005

JON W. DUDAS
*Director of the United States Patent and Trademark Office*